United States Patent Office 3,840,513
Patented Oct. 8, 1974

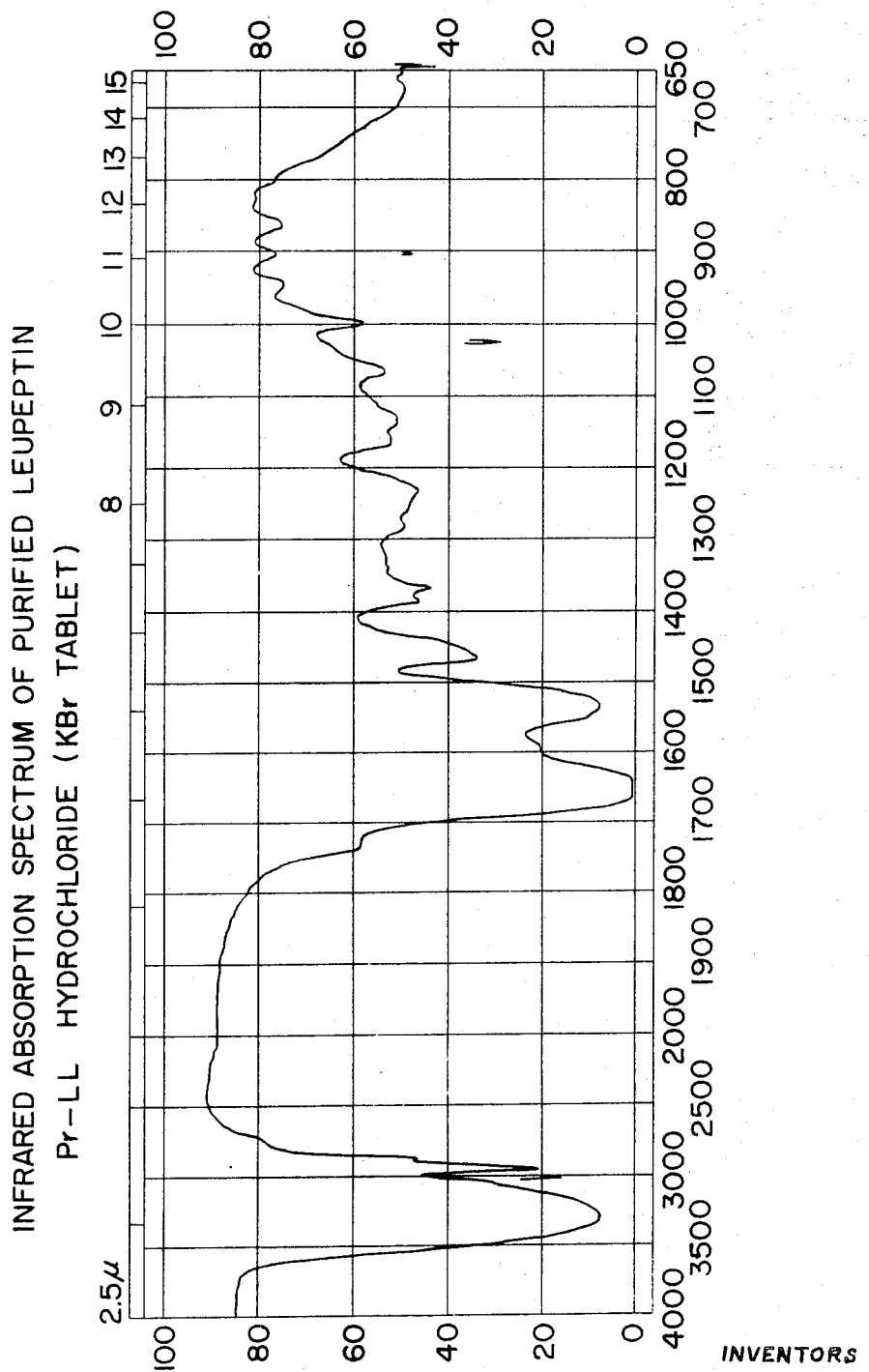

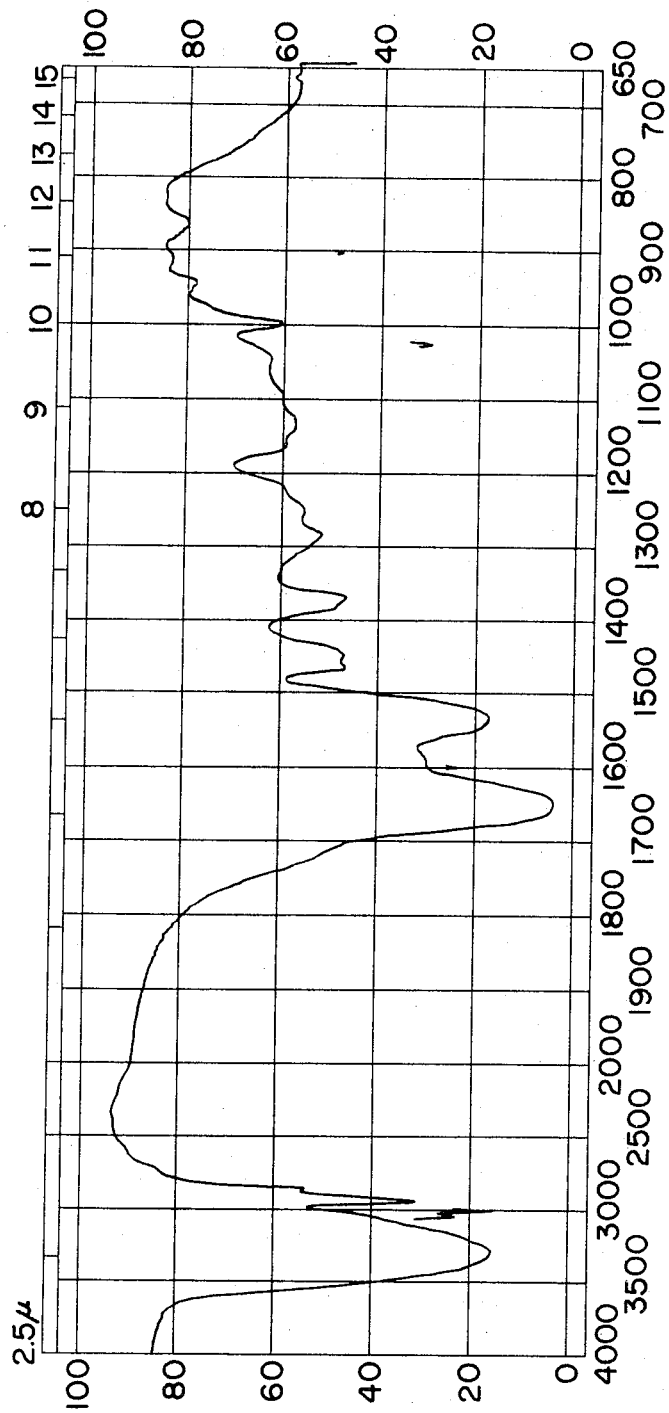

---

3,840,513
THERAPEUTICALLY USEFUL COMPOUND, LEUPEPTINS, AND PROCESSES FOR THE PREPARATION THEREOF
Hamao Umezawa, Tokyo, Takaaki Aoyagi, Fujisawa, and Tomio Takeuchi, Kenji Maeda, Masa Hamada, and Takeshi Hara, Tokyo, Japan, assignors to Zaidan Hojin Biseibutsu Kagaku Kenkyu Kai, Tokyo, Japan
Continuation of abandoned application Ser. No. 814,322, Apr. 8, 1969. This application June 15, 1972, Ser. No. 263,172
Claims priority, application Japan, Apr. 19, 1968, 43/25,820; Mar. 25, 1969, 44/22,080
Int. Cl. C07c 103/52; C07g 7/00
U.S. Cl. 260—112.5  3 Claims

---

ABSTRACT OF THE DISCLOSURE

Leupeptins having the following structures

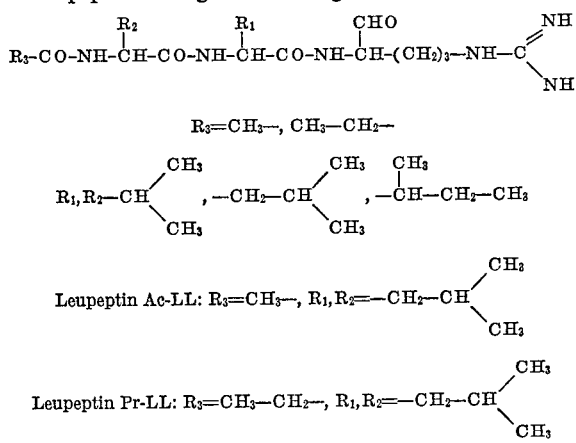

and process for producing leupeptins which comprises cultivating a leupeptins-producing strain of Streptomyces in a medium containing nitrogenous nutrient and separating leupeptins produced in the medium from the culture broth by adsorption on a cation exchange resin and subsequent elution or by extraction with butanol.

---

This is a continuation of application Ser. No. 814,322, filed on Apr. 8, 1969, now abandoned.

This invention relates to a new useful group of substances called leupeptins, the structures of which can be shown by the following formulae:

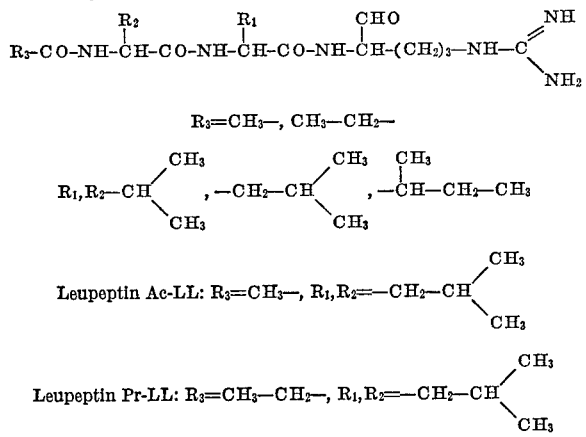

As shown by the formulae, leupeptins are acetyl-L-leucyl-L-leucyl-DL-argininal, propionyl-L-leucyl-L-leucyl-DL-argininal and their analogues in which one or two of L-leucine is or are substituted with L-isoleucine and/or L-valine. This invention relates to leupeptins and to its production. More particularly, it relates to processes for its production by fermentation and methods for recovery and purification. The invention embraces the therapeutically useful substances and their acid addition salts as crude concentrates, as purified solids and in pure forms. Leupeptins are effective in inhibiting enzymatic reactions of trypsin, papain, kallikrein, plasmin and thrombokinase, and in inhibiting fibrinolysis, kinin formation from kininogen and blood coagulation. Leupeptins have low toxicity and exhibit a therapeutic effect on inflammation in rats caused by carrageenin.

As shown by the structures described above, there are two groups of leupeptins depending on acetyl or propionyl group. In this invention, leupeptin with acetyl group is designated leupeptin Ac or another with propionyl group leupeptin Pr. Acetyl or propionyl-L-leucyl-L-leucyl-DL-argininal is abbreviated as leupeptin Ac-LL or Pr-LL, respectively.

FIG. 1 and FIG. 2 are curves of the infrared absorption spectra of the most purified leupeptin Pr-LL hydrochloride and leupeptin Ac-LL hydrochloride taken as potassium bromide tablet.

There is now provided, according to the invention, each of a therapeutically useful compound or their mixtures selected from leupeptins of which structures were described above. There is further provided according to the present invention a process for production of leupeptins which comprises cultivating a strain of Streptomyces in an aqueous medium containing nitrogenous material under submerged aerobic condition until a substantial amount of a leupeptin or leupeptins is or are accumulated in said solution.

Leupeptins were discovered by the present inventors by their systematic screening of an active compound, inhibiting fibrinolysis by plasmin in culture filtrates of Actinomycetes. It was also found by the present inventors that leupeptins are produced by many strains of various species of Streptomyces. Ten of strains which were confirmed to produce leupeptins were classified as follows: Streptomyces roseus (2 strains, their Laboratory Numbers of Institute of Microbial Chemistry were MA839–A1, MB262–M1), Streptomyces roseochromogenes (3 strains, MA943–M1, MB456–AE1, MB260–A2); Streptomyces chartreusis (1 strain, MB58–MG1), Streptomyces albireticuli (1 strain, MB26–A1), Streptomyces thioluteus (1 strain, MB321–A1), Streptomyces lavendulae (1 strain, MB172–A2), Streptomyces noboritoensis (1 strain, MB46–AG). The properties of these species have been described in "The Actinonycetes," vol. II (by S. A. Waksman, The Williams & Wilkins Company, 1961). Moreover, other strains which must be classified to more than 11 species were confirmed to produce leupeptins. Leupeptins-producing ability is widely distributed among Streptomyces, and using methods of testing the activity and preparation described in this invention it is easy to find strains of Streptomyces suitable for production of leupeptins in stock culture and natural sources.

A fermentation broth containing leupeptins is prepared by inoculating spores or mycelia of leupeptins-producing organism into a suitable medium and then cultivating under aerobic condition. The temperature may be varied in wide range of 23–37° C. within which the organism may grow, but the temperature 27–35° C. is preferable. In the submerged aerobic fermentation of the organism for production of leupeptins, the medium contains as the source of carbon a commercially available glyceride oil or carbohydrate such as starch, glucose, glycerol, maltose, dextrin, sucrose, lactose, etc., in pure or crude states and as the source of nitrogen an organic material such as peptone, casein hydrolysate, casein, yeast extract, meat extract, soybean meal, peanut meal, amino acids etc. and when desired, inorganic sources of nitrogen. Though leupeptins are produced in a medium containing these nitrogenous materials, peptone and casein hydrolysate are examples of nitrogen sources suitable for production of leupeptins. The biosynthesis studies show that leucine, isoleucine, valine and guanidine portion of arginine are utilized for production of leupeptins. Therefore, a hydrolysate of protein such as peptone, N-Z amine (Sheffield Chemical, Type A), casein hydrolysate and yeast hydrolysate are members of nitrogen sources suitable for production of leupeptins.

Leupeptins are stable at neutral and acid, but relatively unstable at alkaline, therefore it is desirable to keep the pH of cultured liquid not higher than 7.5 during fermentation. In a medium containing 1.0% glucose, 1.0% starch, 2.0% peptone, 0.5% NaCl to which a leupeptins-producing organism was inoculated and shake-cultured at 27° C., pH at 24, 48, 72 and 96 hours were 6.0, 6.5, 7.5 and 8.0 respectively. Leupeptins were produced already at 24 hours and the maximum yield was observed during 48–72 hours and thereafter decreased. A silicic acid thin layer chromatography of the culture filtrates demonstrated several ninhydrin positive spots including those corresponding to leucine, isoleucine and valine. These spots were observed until 48–72 hours and thereafter disappeared. This is a useful indication of the period of the maximum production of leupeptins during the fermentation.

In a medium containing organic material such as peptone, casein hydrolysate etc., generally various leupeptins are produced simultaneously. However, mycelia of a leupeptins-producing organism, if cultured in a synthetic medium containing leucine, leupeptin Pr-LL and Ac-LL are produced. If instead of leucine, valine or isocleucine is added, then leupeptins containing these amino acids are produced.

The method of testing the antiplasmin activity was as follows: the mixture consisting of 0.5 ml. of euglobulin solution prepared from human serum by the method described by Kline (J. Biol. Chem., 204, 949, 1953) and Norman (J. Exptl. Med., 106, 423, 1957), 0.4 ml. of 1/50 N phosphate buffer (PBS) of pH 7.2 in physiological saline containing a test material and 0.1 ml. of streptokinase solution (200 units/0.1 ml. of PBS) was incubated at 37° C. for 3 minutes and then 2.0 ml. of fibrinogen solution (2.0% in PBS) was added and incubated at 37° C. for 20 minutes; after the incubation 1.5 ml. of 3.5M perchloric acid was added, kept at room temperature for one hour, centrifuged and the absorbance of the supernatant at 280 mμ was determined. The percent inhibition was calculated as follows: $(a-b)/b \times 100$, wherein $a$ was the absorbance with leupeptin and $b$ was the absorbance without leupeptin.

Leupeptins are stable at neutral and acid. No decomposition occurs when heated at in 0.1N HCl at 95–100° C. for 30 minutes, but complete decomposition occurs when heated in 0.1N NaOH at 95–100° C. for 30 minutes. If leupeptins are kept in the aqueous solutions of pH 9.0 at 60° C. for 30 minutes, more than 50% decomposition occurs. Therefore, it is desirable to treat the material at neutral or acid during the extraction.

In the cultured broth of leupeptins-producing strain leupeptins exist mainly in the liquid part. Leupeptins are enough stable for evaporation of broth by distilation under vacuum, and from thus concentrated solution leupeptins can be precipitated by addition of a solvent in which leupeptins are practically insoluble and which is miscible with water such as acetone. However, an adsorption process is more preferable for extraction of leupeptin from the fermentation broth. As an adsorbent an active carbon, ion exchange resin, alumina, silicic acid etc. which can adsorb leupeptins and from which leupeptins can be eluted are able to be employed. For instance, leupeptins are adsorbed by an active carbon and eluted with acidic water, acidic methanol, acidic aqueous methanol or acidic aqueous ethanol. If the rapid elution is desired, the acidic solvent is more desirable than the neutral solvent. An ion exchange resin is an adsorbent more suitable for extraction of leupeptins. Leupeptins have guanidine group and therefore, a cation exchange resin is used. A porous weakly acidic resin, for instance, Lewatit CNP (Farbenfabriken Bayer A.G.) is preferable. The cation exchange resin can be used in forms of H, NH$_4$, Na, Li and their mixture. If a cation exchange resin is used in H form, leupeptins adsorbed are eluted slowly with dilute hydrochloric acid or 50% aqueous acetone. However, an acidic organic solvent such as 0.5N HCl in 50% aqueous acetone or 0.5N HCl in 50–80% aqueous methanol is more suitable for the elution.

A carbon chromatography, for instance, adsorption of leupeptins from the aqueous solution and elution with acidic aqueous methanol, is useful for the further purification. Alumina chromatography can be also used for the purification. The alumina chromatography is developed with methanol, ethanol, chloroform-methanol, ethyl acetate-methanol etc. If leupeptins are dissolved in methanol, ethanol or their mixtures with water, then, leupeptins pass the column of alumina. This process is useful for separation of leupeptins from colored impurities. An ion exchange chromatography is also useful for purification of leupeptins, for instance, a cation exchange resin is used in the mixed form of H and Na and leupeptins are eluted with 0.1N–0.2N HCl.

Silicic acid column chromatograph is also useful for purification of leupeptins. For instance, leupeptins are dissolved in mixture of chloroform-methanol (9:1) and the chromatograph is developed with chloroform-methanol (8:2).

A counter current distribution can be also utilized for extraction or purification of leupeptins. A multistage centrifugal extractor such as Podbielniak centrifugal extractor can be employed for this purpose. The distribution coefficient of leupeptins between butanol and phosphate buffer of pH 6.0 is about 1. Extraction of leupeptins with butanol is useful for purification of leupeptins.

Leupeptins have guanidine group and are precipitated from the aqueous solution as their picrates, flavianates, reineckates, 5 - methyl-β-naphthalenesulfonic acid salts. This precipitation method is also useful for preparation of leupeptins. These salts are treated with organic solvents containing hydrochloric acid and are converted to hydrochloride of leupeptins. The following is efficient process of extraction and purification of leupeptins, from cultured broth: leupeptins are adsorbed by a method using porous cation exchange resin having carboxylic acid group, eluted with hydrochloric acid-methanol, the eluate is concentrated under vacuum, and the concentrated aqueous solution is extracted several times with butanol and the butanol extract is concentrated to dryness, the residue in aqueous solution is decolorized by passing through the column of anion exchange resin, and the effluent is evaporated yielding purified mixtures of hydrochlorides of leupeptins.

The most purified leupeptin Pr hydrochloride which was shown to contain mainly leupeptin Pr-LL by the result of the amino acid analysis (leucine 1.00, isoleucine 0.10, valine 0) showed the following properties: A white powder melting at the wide range of 110–140° C.

$[\alpha]_D^2 -52°$ (c.=1, methanol), pKa' is more than 12.

Analysis.—Calcd. for $C_{21}H_{40}O_4N_6 \cdot HCl \cdot H_2O$: C, 50.95; H, 8.76; O, 16.16; N, 16.98; Cl, 7.16. Found: C, 51.13; H, 8.77; O, 14.96; N, 17.10; Cl, 5.73.

It has no characteristic ultraviolet absorption. The IR spectrum shows absorption corresponding to aldehyde (1720–1730 cm.$^{-1}$) and strong amide bands (1650, 1540 cm.$^{-1}$). The NMR (nuclear magnetic resonance) spectrum (100 mHz.) in $(CD_3)_2SO$ exhibits the existence of N-propionyl group in the molecule depending on peaks at δ 1.00 (triplet, 3H) and at δ 2.12 (quartet, 2H).

The most purified leupeptin Ac hydrochloride which was shown to contain mainly leupeptin Ac-LL by the result of amino acid analysis (leucine 1.00, isoleucine 0.04, valine 0.01) showed the following properties: A white powder melting at the wide range of 75–110° C., $$[\alpha]_D^{22} \; -52° \; (c.=1, \text{methanol}),$$

pKa' is more than 12.

*Analysis.*—Calcd. for $C_{20}H_{38}O_4N_6 \cdot HCl \cdot H_2O$: C, 49.93; H, 8.58; O, 16.63; N, 17.47; Cl, 7.37. Found: C, 50.34; H, 8.57; O, 16.42; N, 16.03; Cl, 5.27.

It has no characteristic ultraviolet absorption. The IR spectrum is similar to that of leupeptin Pr hydrochloride. On the NMR spectrum (100 mHz.) in $(CD_3)_2SO$, a peak at δ 1.85 (singlet, 3H) shows the existence of N-acetyl group.

The hydrochlorides of leupeptins are soluble in water, methanol, ethanol, butanol, acetic acid, dimethylformamide and dimethylsulfoxide, and scarcely soluble in ethyl acetate, acetone, chloroform, carbon tetrachloride, ethyl ether and n-hexane.

Leupeptins give positive Rydon-Smith, red tetrazolium, 2,4-dinitrophenylhydrazine, Sakeguchi, diacetyl, and pentacyanoaquoferriate reactions, and negative ninhydrin, Jaffe, ferric chloric, anthrone, Molisch, benzidine reactions.

The paper chromatography of leupeptins by ascending method revealed a single spot detected by Rydon-Smith, red tetrazollium or Sakaguchi reaction at Rf 0.9–0.95 developing with upper layer of butanol-acetic acid-water (4:1:5 in volume), 0.9–0.95 with n-propanol-water (7:3) and 0.4–0.6 with ethyl acetate-methanol-water (4:1:1). On high-voltage paper electrophoresis (3,500 v., 15 min.) using formic acid-acetic acid-water (25:75:900), leupeptins 5–6 cm. toward the cathode from the starting point. On thin layer chromatography using silica gel G (E. Merck), leupeptins give a single spot at Rf 0.6–0.7 with n-propanol-water (7:3), 0.2–0.4 with chloroform-methanol (7:3), 0.2–0.3 with acetone-water (1:1) and 0.3–0.4 with ethyl acetate-acetic acid-water (60:17:17). Leupeptins Pr and Ac can not be distinguished by paper and thin layer chromatographies and by high-voltage paper electrophoresis at the conditions described above. On thin layer chromatography of silica gel G using butanol-butyl acetate-acetic acid-water (4:2:1:1 in volume) as developing solvent, leupeptins Pr and Ac are separated. Each of them show two spots: Rf 0.45–0.50 and 0.35–0.45 for leupeptin Pr, and Rf 0.35–0.45 and 0.30–0.35 for leupeptin Ac. The extract from each spots are detected as respective two spots on the same thin layer chromatography.

Leupeptin Pr-LL di-n-butyl acetal hydrochloride is a white powder melting at 70–90° C., $[\alpha]_D^{23}$ −46° (c.=2, methanol), pKa' is more than 12.

*Analysis.*—Calcd. for $C_{29}H_{58}O_5N_6 \cdot HCl \cdot H_2O$: C, 55.70; H, 9.83; O, 15.35; N, 13.44; Cl, 5.67. Found: C, 55.73; H, 9.68; O, 14.43; N, 13.56; Cl, 5.86.

The molecular formula is established as $C_{29}H_{58}O_5N_6$ by the parent peak m/e=570 in the mass spectrum.

Leupeptin Pr-LL di-n-butyl acetal picrate is a yellow crystalline powder melting at 60–90° C.

*Analysis.*—Calcd. for $C_{29}H_{58}O_5N_6 \cdot C_6H_3O_7N_3$: C, 52.55; H, 7.69; O, 24.00; N, 15.76. Found: C, 52.32; H, 7.80; O, 24.80; N, 15.43.

Leupeptine Ac-LL di-n-butyl acetal hydrochloride is a white powder melting at 70–90° C., $[\alpha]_D^{23}$ −43° (c.=2, methanol), pKa' is more than 12.

*Analysis.*—Calcd. for $C_{28}H_{56}O_5N_6 \cdot HCl \cdot \frac{1}{2}H_2O$: C, 55.84; H, 9.71; O, 14.61; N, 13.96; Cl, 5.89. Found: C, 56.03; H, 9.67; O, 14.77; N, 13.68; Cl, 6.16.

The molecular formula is derived from the high-resolution mass spectrum of its hydrochloride: Calcd. mol wt. for $C_{28}H_{56}O_5N_6$, 556.431; found, m/e 556.429±0.003.

Leupeptin Ac-LL di-n-butyl acetal picrate is a yellow crystalline powder melting at 60–100° C.

*Analysis.*—Calcd. for $C_{28}H_{56}O_5N_6 \cdot C_6H_3O_7N_3$: C, 51.96; H, 7.57; O, 24.43; N, 16.04. Found: C, 51.78; H, 7.51; O, 25.17; N, 15.67.

Leupeptins Pr and Ac di-n-butyl acetals hydrochlorides have no characteristic ultraviolet absorption. The IR spectra show the strong absorption at 1070 cm.$^{-1}$ attributed to the acetal. On thin layer chromatography using silica gel G and butanol-butyl acetate-acetic acid-water (4:2:1:1), leupeptins Pr di-n-butyl acetal and Ac di-n-butyl acetal give each single spot at Rf 0.65 and 0.60, respectively.

The most purified leupeptins exhibit antiplasmin activity, inhibition of trypsin, papain, kallikrein but not chymotrypsin. The 50% inhibition concentrations of leupeptins are obtained as follows: proteolytic hydrolysis of fibrin by plasmin, casein by trypsin and hemoglobin by papain at 6 mcg./ml., 2 mcg./ml. and 0.15 mcg./ml. of leupeptins and esterolytic hydrolysis of p-toluenesulfonyl-L-arginine methyl ester (TAME) and α-N-benzoylarginine ethyl ester (BAEE) by plasmin, trypsin or kallikrein at 65–85 mcg./ml. of leupeptins. The type of inhibition of leupeptins was confirmed to be competitive against hydrolysis of TAME by trypsin and hemoglobin by papain. The leupeptins inhibit blood coagulation of human, rabbit, cat and cow bloods. The inhibition against coagulation of bloods of mice, rats and dogs is very weak. These activities of leupeptins were compared with trasylol, trypsin inhibitor, trans-4-aminomethylcyclohexane carboxylic acid (t-AMCHA) and ε-aminocaproic acid (ε-ACA). Leupeptins, trypsin inhibitor and trasylol were found to be potent inhibitors against plasmin and trypsin. The inhibitory effect of leupeptins was 100 times more potent than that of ε-ACA and 20 times more potent than that of t-AMCHA on plasmin system. Leupeptins were potent inhibitors against thrombokinase but not recognized against α-chymotrypsin. Trasylol did not inhibit thrombokinase but was potent inhibitor against α-chymotrypsin. Leupeptins also showed inhibition against carrageenin inflammation in rats. Intraperitoneal injection of more than 6.25 mg./kg. of leupeptins or oral administration of more than 12.5 mg./kg. to rats inhibited inflammation in foot pads caused by subcutaneous injection of 0.05 ml. of 1.0% carrageenin solution. Leupeptins were well absorbed through oral route. When 1,000 mg./kg. was orally given to rabbits, the highest blood level of about 200 mcg./ml. was observed in serum after 1.5 hours and 2,400 mcg./ml. was observed in urine after 3–5 hours. Totally about 40% of leupeptins administered was recovered in urine. LD$_{50}$ was as follows: mice, 118 mg./kg. by the intravenous injection, 1,405 mg./kg. by the subcutaneous injection, 1,550 mg./kg. orally; rats: 125 mg./kg. by iv., >4,000 mg./kg. by sc. >4,000 mg./kg. orally; rabbits 35 mg./kg. by iv., 300 mg./kg. sc., >1,500 mg./kg. orally.

Examples will be set forth below. However, it will be understood from the foregoing that the present invention is not limited to processes shown in the examples. Since the characterstics of leupeptins are disclosed herein, it will be obvious that it is possible to adopt various variations or modifications which are not concretely described herein.

EXAMPLE 1

*Streptomyces roseus* MA839–A1 was cultured at 27° C. for 71 hr. in 85 flasks (dispense volume in a flask: 125 ml.) by reciprocal shaker (130 stroke/min.). The medium contained 1% glucose, 1% starch, 2% Polypepton (Daigo Eiyo Co.) and 0.5% sodium chloride and adjusted to pH 7.0 with 2N sodium hydroxide. Vegetative inoculum, 1% by volume, grown for 2 days in the same medium was used. The culture broth was collected (10 liters, anti-plasmin activity: ID$_{50}$ 0.015 ml./ml.) and centrifuged at 3,000 r.p.m. for 10 min. To the supernatant (9 liters, pH 7.3), 135 g. of carbon (Wako Pure Chem.) was added. After stirring for 30 min., the carbon was separated by filtration and washed with 6 liters of water and eluted with 1,500 ml. and 1,200 ml. of acidic 80% methanol (pH 2 with 2N hydrochloric acid). The active eluate was neutralized with Amberlite IR 45 (OH form) and concentrated to dryness yielding 22 g. of a brownish powder (anti-plasmin activity: $ID_{50}$ 95 mcg./ml., yield of activity: 38%). The brownish powder was dissolved in 500 ml. of water (pH 7.0) and poured over a column of carbon (Wako Pure Chem., 110 g.). The column was washed with 2 liters of water and 2 liters of 0.02N hydrochloric acid, and eluted with 0.02N hydrochloride acid in 80% methanol. The eluate was neutralized with Amberlite IR 45 (OH form) and concentrated to dryness yielding 8.9 g. of a yellowish powder (anti-plasmin activity: $ID_{50}$ 53 mcg./ml., yield of activity: 72%). The yellowish powder (7.5 g.) was dissolved in 50 ml. of methanol and poured over a column of alumina (Woelm, acidic, 750 g.), and the column was developed with methanol. The eluate which gave positive Rydon-Smith, Sakaguchi and red tetrazolium reactions, was concentrated to dryness yielding 2.3 g. of leupeptins hydrochlorides (anti-plasmin activity: $ID_{50}$ 12 mcg./ml., total yield of activity: 24%).

EXAMPLE 2

*Streptomyces roseus* MA839–A1 was cultured in a 2,000 liters fermentor (dispense volume: 1,500 liters). The medium contained 2% glucose, 1% starch, 2% peptone, 0.5% NaCl and 0.2% $KH_2PO_4$, and sterilized at 110° C. for 30 min. Vegetative inoculum, 0.13% by volume, grown for 48 hr. in the same medium was used. The temperature was maintained at 27° C., the air-flow rate was held constant at 1,500 liters per minute and the agitation was operated at 200 r.p.m. The culture broth (1,500 liters, pH 7.15, anti-plasmin activity: $ID_{50}$ 0.015 ml./ml.) was harvested after 53.5 hr. and filtered using 45 kg. of Dicalite as a filter aid. The filtrate was passed through a column of Lewatit CNP resin (Farbenfabriken Bayer A.G., pH 6.0 with sodium hydroxide, 180 liters). The column was washed with water and eluted with 300 liters of 1N hydrochloric acid in 80% methanol and 200 liters of 0.2N hydrochloric acid in 80% methanol. The active eluate (565 liters) was adjusted to pH 5.2 with 6N sodium hydroxide and concentrated to 90 liters. The concentrate was extracted with butanol (80 liters) and the extract was concentrated to dryness yielding 979.1 g. of a brownish powder (anti-plasmin activity: $ID_{50}$ 13 mcg./ml., yield of activity: 75%).

The brownish powder (164 mg.) in 2 ml. of water was decolorized and purified by a resin chromatography of Dowex 1X2 (100–200 mesh, Cl form, 10 ml.) developing with water. The eluate, which gave positive Rydon-Smith and Sakaguchi reactions, was concentrated to dryness yielding 126 mg. of a white powder of leupeptins hydrochlorides (anti-plasmin activity: $ID_{50}$ 11 mcg./ml., yield of activity: 91%).

EXAMPLE 3

Separation of Leupeptins Pr and Ac Di-n-Butyl Acetals

The leupeptins hydrochlorides (19.2 g., $ID_{50}$: 15 mcg./ml.) was refluxed in 270 ml. of butanol for 2 hr. The butanol solution was washed with 270 ml. of water and concentrated to dryness yielding 23.4 g. of a crude powder. The crude powder (14.0 g.) was dissolved in 20 ml. of butanol-butyl acetate-acetic acid-water (4:8:1:1) and subjected to a column chromatography of silicic acid (Mallinckrodt, 900 g.) developing with the same solvent. The first eluate (150 ml.), which gave Rydon-Smith and Sakaguchi reactions, was concentrated to dryness yielding 1.5 g. of leupeptin Pr di-n-butyl acetal hydrochloride as a white powder. The second eluate (500 ml.) was concentrated to dryness yielding 5.3 g. of a mixture containing leupeptins Pr and Ac di-n-butyl acetals (hydrochloride). The third eluate (1,400 ml.) was concentrated to dryness yielding 3.4 g. of leupeptin Ac di-n-butyl acetal hydrochloride as a white powder.

EXAMPLE 4

Leupeptin Pr Hydrochloride

Leupeptin Pr di-n-butyl acetal hydrochloride (93 mg.) was dissolved in 5 ml. of 0.01N hydrochloric acid and heated at 60° C. for 3 hr. The solution was neutralized to pH 6.0 with Amberlite IR 45 (OH form) and concentrated to dryness yielding 72 mg. of leupeptin Pr hydrochloride as a white powder ($ID_{50}$: 8 mcg./ml.).

EXAMPLE 5

Leupeptin Ac Hydrochloride

Leupeptin Ac di-n-butyl acetal hydrochloride (1.0 g.) was dissolved in 50 ml. of 0.01N hydrochloric acid and treated by the same procedure described in Example 4. Then, a white powder of leupeptin Ac hydrochloride (800 mg., $ID_{50}$: 12 mcg./ml.) was obtained.

EXAMPLE 6

Leupeptin Pr Di-n-Butyl Acetal Picrate

To a solution of leupeptin Pr di-n-butyl acetal hydrochloride (48 mg.) in 2 ml. of water, 31 mg. of sodium picrate in 1 ml. of water was added at 40–50° C. After the mixture had been kept overnight at room temperature, the oily syrup was separated by decantation and dried in reduced pressure. The residue was washed with 2 ml. of cold water and a yellow crystalline picrate of leupeptin Pr di-n-butyl acetal (50 mg.) was obtained. The picrate was recrystallized with hot water.

EXAMPLE 7

Leupeptin Ac Di-n-Butyl Acetal Picrate

To a solution of leupeptin Ac di-n-butyl acetal hydrochloride (100 mg.) in 2 ml. of water, 88 mg. of sodium picrate in 1 ml. of water was added at 40–50° C. A yellow crystalline picrate of leupeptin Ac di-n-butyl acetal (109 mg.) was obtained by the same procedure as described in Example 6.

EXAMPLE 8

A leupeptins-producing strain (*Streptomyces roseus* MA839–A1) was shake-cultured for 48 hours by the similar condition described in Example 1. The mycelium was separated from the cultured broth (375 ml.) by centrifugation, and washed with 80 ml. of sterilized physiological saline. The wet mycelium (7.0–7.8 g.) obtained was suspended in 26 ml. of sterilized water. The suspension (2 ml.) was inoculated into 30 ml. of a synthetic medium containing 0.2% $NH_4NO_3$, 0.1% $K_2HPO_4$, 0.05% $MgSO_4 \cdot 7H_2O$, 0.05% KCl, 0.001% $FeSO_4 \cdot 7H_2O$, 1.0% glucose, 1.0% starch and a mixture of amino acids (3.05 mmoles of L-leucine, 0.61 mmoles of L-isoleucine, 0.70 mmoles of L-proline and 0.23 mmoles of L-arginine), and shaked at 27° C. for 24 hours. The reaction mixture was filtered and adsorbed on a column of Amberlite IRC 50 (5 ml. of H form) resin. The column was washed with 50 ml. of 50% aqueous acetone and eluted with 0.5N HCl in 50% aqueous acetone. The eluate (15 ml.) was neutralized with Amberlite IR 45 (OH form) and concentrated to dryness. The residue was dissolved in 1 ml. of 80% methanol and subjected to a column of acidic alumina (5 g.) developing with 25 ml. of methanol. The active eluate (5 ml.) was concentrated and spotted on thin layer plate of silica gel G. The plate was developed with a mixture of chloroform and methanol (4:1). Leupeptins were extracted with methanol from silica gel which was collected from the area at Rf 0.15–0.30. The methanol solution was concentrated to dryness yielding a white powder (1.2 mg.) of leupeptins. Anti-plasmin activity: $ID_{50}$ 10 mcg./ml. The amino acid analysis of the acid hydrolysate (in molar ratio) gave leucine (1.13), isoleucine (0.12), proline (0.09) arginine (trace), valine (0).

In the similar experiment as described above, when 2.96 mmoles of L-leucine, 0.57 mmoles of L-isoleucine and 0.65 mmoles of L-proline was employed as a mixture of amino acids, 0.6 mg. of leupeptins was obtained. The amino acid analysis gave leucine (1.16), isoleucine (0.10), proline (0.06).

When 3.05 mmoles of L-leucine, 0.7 mmoles of L-proline and 0.23 mmoles of L-arginine was employed as a mixture of amino acids, 2 mg. of leupeptins was obtained. The amino acid analysis gave leucine (1.39), isoleucine (0.01), proline (0.10).

By virtue of the biological activities described above, leupeptins and their salts are useful for treatment of miscellaneous inflammatory diseases. For treatment of pancreatitis, leupeptins in a sterile formulation are subcutaneously, intramuscularly, intravenously or orally given. For skin diseases, leupeptins can be used as a paste, a cream, a solution or a suspension.

Included within the scope of the present invention are acid addition salts of leupeptins with organic and inorganic acids such as hydrochloric acid, sulfuric acid, hydrobromic acid, hydriodic acid, phosphoric acid, nitric acid, citric acid, malate acid, tartaric acid, benzoic acid, cinnamic acid, ascorbic acid, acetic acid, picric acid, phytic acid, levopimaric-6,8a-cis-endosuccinic acid, sulfamic acid, glycolic acid and mandelic acid. For therapeutic purposes use is made of salts of nontoxic acids but salts of toxic acids, e.g. picric acid, are useful in isolation procedures, e.g. as precipitants from aqueous solutions, and for disinfectant purposes where toxicity is not important.

When desired for specific purposes and rendered pharmaceutically compatible, there may be admixed with the compounds of the present invention other medicaments such as antihistamines, sulfa drugs (e.g. sulfadiazine, sulfabenzamide, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamide, N'-3,4-dimethylbenzoylsulfanilamide, benzylsulfanilamide and N'-2-(2-quinoxalyl) sulfanilamide), liptropic agents (particularly methionine, choline, isositol and beta-sitosterol and mixtures thereof), stimulants of the central nervous system (e.g. caffeine, amphetamines), local anesthetics, analgesics (e.g. aspirin, salicylamide, sodium gentisate, p-acetylaminophenol, phenaceton, codeine), laxatives (e.g. phenolphthalein), sedatives (e.g. bariturates, bromides), antibiotic agents (e.g. penicillins, kanamycin, streptomycin, dihydrostreptomycin, bacitracin, polymixin, tyrothricin, erythromycin, chlortetracycline, oxytetracycline, tetracycline, oleandomycin, chloramphenicol, magnamycin, novobiocin, cycloserine, neomycin) vitamines (e.g. vitamines A, $A_1$, $B_1$, $B_2$, $B_6$, $B_{12}$ and members of that family, folic acid and members of that family, vitamines C, $D_2$, $D_3$ and E), hormones (e.g. cortisone, hydrocortisone, 9-α-fluorocortisone, 9-α-fluorohydrocortisone, prednisone and prednisolone), anabolic agents (e.g. 11,17 - dihydroxy-9-α-fluoro-17-α-methyl-4-androsten - 3-one; 17-ethyl-19-nortestosterone) and antifungal agents (e.g. mycostatin).

We claim:

1. A compound having the structural formula:

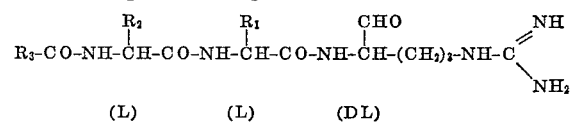

wherein:

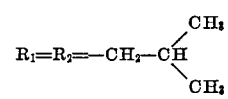

and $R_3=$—$CH_3$ or —$CH_2$—$CH_3$ or an acid addition salt thereof.

2. A compound according to claim 1 wherein $R_3$ is —$CH_3$ or an acid addition salt thereof.

3. A compound according to claim 1 wherein $R_3$ is —$CH_2$—$CH_3$ or an acid addition salt thereof.

References Cited

Kawamura et al.: Chem. Pharm. Bull., *17*, 1902 (1969).

LEWIS GOTTS, Primary Examiner

R. J. SUYAT, Assistant Examiner

U.S. Cl. X.R.

424—177